(12) United States Patent
Pandey

(10) Patent No.: US 11,368,382 B2
(45) Date of Patent: Jun. 21, 2022

(54) COMMUNICATIONS DEVICE AND METHOD OF COMMUNICATIONS

(71) Applicant: NXP B.V., Eindhoven (NL)

(72) Inventor: Sujan Pandey, Waalre (NL)

(73) Assignee: NXP B.V., Eindhoven (NL)

( * ) Notice: Subject to any disclaimer, the term of this patent is extended or adjusted under 35 U.S.C. 154(b) by 83 days.

(21) Appl. No.: 16/593,218

(22) Filed: Oct. 4, 2019

(65) Prior Publication Data

US 2021/0105198 A1 Apr. 8, 2021

(51) Int. Cl.
*H04L 43/18* (2022.01)
*H04L 43/10* (2022.01)
*H04L 67/12* (2022.01)
*H04L 69/22* (2022.01)
*H04L 1/00* (2006.01)

(52) U.S. Cl.
CPC ............ *H04L 43/10* (2013.01); *H04L 1/0083* (2013.01); *H04L 67/12* (2013.01); *H04L 69/22* (2013.01)

(58) Field of Classification Search
CPC ......... H04L 43/10; H04L 69/22; H04L 67/12; H04L 1/0083; H04L 1/0072; H04L 1/0061; H04L 49/602; H04L 5/0055; H04L 1/189; H04L 1/08; H04L 1/1887; H04L 1/0009; H04L 1/1671; H04L 43/0847; H04L 43/18; H04W 4/90; H04W 4/12; H04W 56/01; H04W 52/0261; H04W 4/70; H04W 72/0446; H04W 88/04; H04W 76/50; Y02D 30/70
See application file for complete search history.

(56) References Cited

U.S. PATENT DOCUMENTS

| | | | | |
|---|---|---|---|---|
| 8,189,578 | B2 * | 5/2012 | Olesinski | H04L 47/10 710/52 |
| 8,976,680 | B2 * | 3/2015 | Kompella | H04L 47/35 370/241.1 |
| 10,623,291 | B2 * | 4/2020 | Seo | H04J 3/0638 |
| 10,666,393 | B2 * | 5/2020 | Kim | H04L 49/602 |
| 2009/0185551 | A1 * | 7/2009 | Winter | H04L 12/66 370/351 |
| 2018/0167846 | A1 * | 6/2018 | Liu | H04L 69/08 |

* cited by examiner

*Primary Examiner* — Hanh N Nguyen

(57) ABSTRACT

Embodiments of a device and method are disclosed. In an embodiment, a method of communications involves at a communications device, detecting an erroneously transmitted packet based on a communications protocol associated with the erroneously transmitted packet, and from the communication device, notifying a wired communications network of the erroneously transmitted packet.

17 Claims, 14 Drawing Sheets

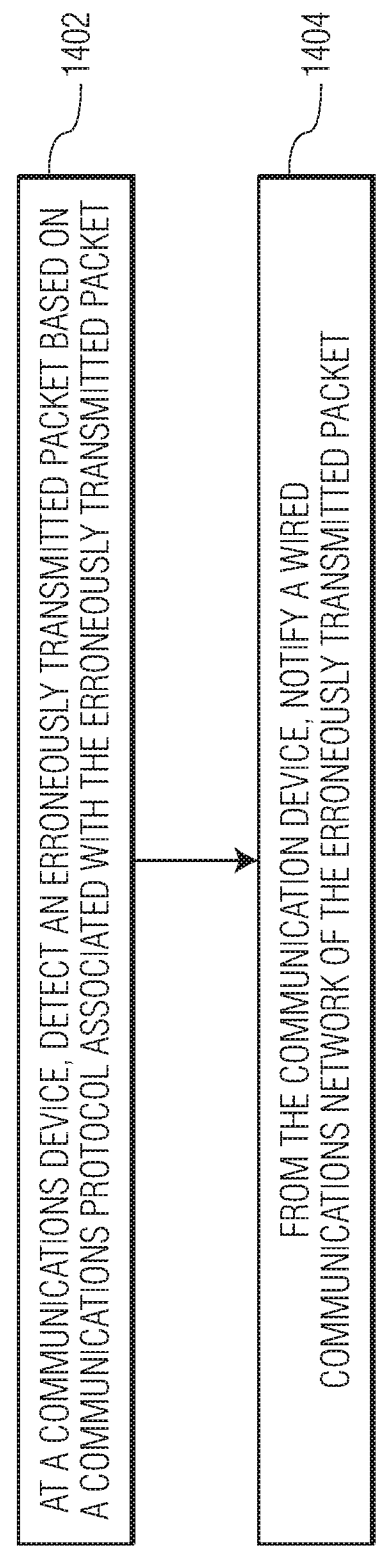

COMMUNICATIONS DEVICE AND METHOD OF COMMUNICATIONS

BACKGROUND

In a communications network with limited resources, it is generally desirable to have a network technology with reduced communications complexity, efficient power and/or communications bandwidth utilization and built-in link error diagnostic capability with low communications overhead. For example, in an in-vehicle network (IVN) (e.g., with sensor nodes such as cameras, radars, and/or light detection and ranging (LiDAR) sensors) where power supply and communications bandwidth can be limited and the dimension and cost of network components are typically constrained, a network technology with reduced communications complexity and efficient power and bandwidth utilization and built-in diagnostic capability can improve network lifetime, reduce power consumption and/or increase communications efficiency. However, typical network technology may not be able to provide built-in link error diagnostic capability for a communications network with limited resources. Therefore, there is a need for a network technology that has link error diagnostic capability with low communications overhead.

SUMMARY

Embodiments of a device and method are disclosed. In an embodiment, a method of communications involves at a communications device, detecting an erroneously transmitted packet based on a communications protocol associated with the erroneously transmitted packet, and from the communication device, notifying a wired communications network of the erroneously transmitted packet.

In an embodiment, notifying the wired communications network of the erroneously transmitted packet includes transmitting an operations, administration, and management (OAM) packet that includes information related to the communications protocol associated with the erroneously transmitted packet.

In an embodiment, the information related to the communications protocol associated with the erroneously transmitted packet includes a protocol type of the communications protocol associated with the erroneously transmitted packet and a protocol counter value associated with the erroneously transmitted packet.

In an embodiment, the information related to the communications protocol associated with the erroneously transmitted packet further includes an address associated with the erroneously transmitted packet.

In an embodiment, the method further includes checking the information related to the communications protocol associated with the erroneously transmitted packet against a register table at a second communications device.

In an embodiment, the method further includes determining a communications link between the communications device and the second communications device as being erroneous when the information related to the communications protocol associated with the erroneously transmitted packet matches the register table at the second communications device.

In an embodiment, the method further includes determining a communications link between the communications device and the second communications device as being error-free when the information related to the communications protocol associated with the erroneously transmitted packet does not match the register table at the second communications device.

In an embodiment, detecting the erroneously transmitted packet based on the communications protocol associated with the erroneously transmitted packet includes detecting the erroneously transmitted packet based on the communications protocol in which the erroneously transmitted packet is formatted.

In an embodiment, detecting the erroneously transmitted packet based on the communications protocol associated with the erroneously transmitted packet includes detecting the erroneously transmitted packet based on the communications protocol in which the erroneously transmitted packet is formatted and a protocol counter value associated with the erroneously transmitted packet.

In an embodiment, detecting the erroneously transmitted packet based on the communications protocol associated with the erroneously transmitted packet includes detecting the erroneously transmitted packet based on the communications protocol in which the erroneously transmitted packet is formatted, a protocol counter value associated with the erroneously transmitted packet and an address associated with the erroneously transmitted packet.

In an embodiment, the wired communications network is an IVN.

In an embodiment, the wired communications network is an asymmetrical communications network such that communications in a first direction of a network connection within the wired communications network occur at a first rate that is higher than a second rate at which communications in a second direction of the network connection occurs, and the first direction is opposite to the second direction.

In an embodiment, a communications device includes a packet error detection unit configured to detect an erroneously transmitted packet based on a communications protocol associated with the erroneously transmitted packet and a transmitter unit configured to notify a wired communications network of the erroneously transmitted packet.

In an embodiment, the transmitter unit is configured to transmit an OAM packet that includes information related to the communications protocol associated with the erroneously transmitted packet.

In an embodiment, the information related to the communications protocol associated with the erroneously transmitted packet includes a protocol type of the communications protocol associated with the erroneously transmitted packet and a protocol counter value associated with the erroneously transmitted packet.

In an embodiment, the information related to the communications protocol associated with the erroneously transmitted packet further includes an address associated with the erroneously transmitted packet.

In an embodiment, the packet error detection unit is further configured to detect the erroneously transmitted packet based on the communications protocol in which the erroneously transmitted packet is formatted.

In an embodiment, the packet error detection unit is further configured to detect the erroneously transmitted packet based on the communications protocol in which the erroneously transmitted packet is formatted and a protocol counter value associated with the erroneously transmitted packet.

In an embodiment, the wired communications network is an IVN.

In an embodiment, a wired communications network includes a wired transmission media and communications devices configured to communicate via the wired transmission media. Each of the communications devices is configured to detect an erroneously transmitted packet based on a communications protocol associated with the erroneously transmitted packet and notify the wired communications network of the erroneously transmitted packet.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 14 is a process flow diagram of a method of communications in accordance to an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
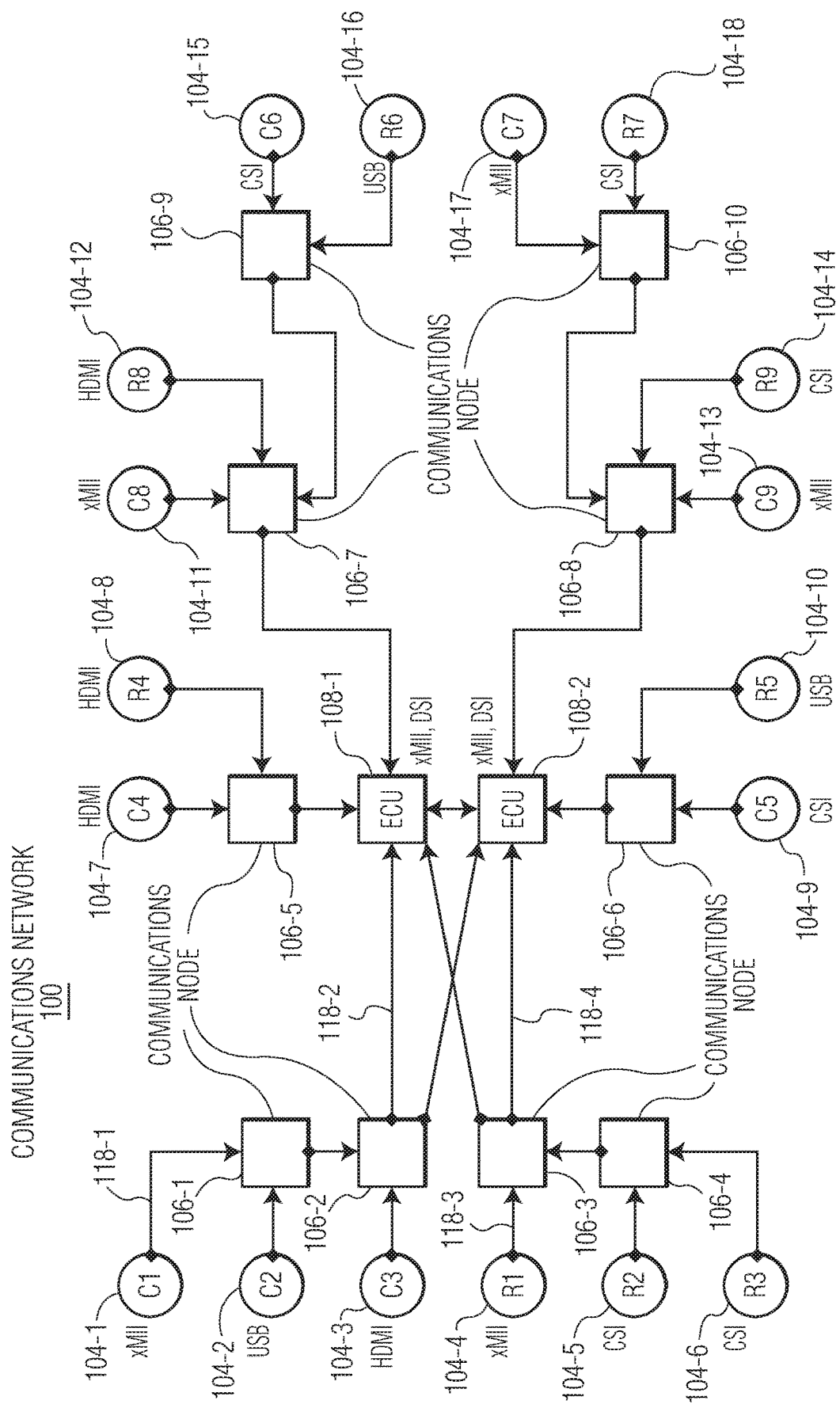
FIG. 1 depicts a communications network that includes multiple sensor nodes, communications nodes, and electronic control units (ECUs).

FIG. 1 depicts a communications network 100 that includes one or more sensor nodes 104-1, 104-2, . . . , 104-18, one or more communications nodes 106-1, 106-2, . . . , 106-10, and one or more electronic control units (ECUs) 108-1, 108-2. The communications network can be used in various applications, such as automotive applications, communications applications, industrial applications, medical applications, computer applications, and/or consumer or appliance applications. In some embodiments, the communications network is a wired communications network and the sensor nodes, the communications nodes, and the ECUs communicate through electrical cables or wires, which are made of conductive materials (e.g., metals). For example, the sensor nodes, the communications nodes, and the ECUs communicate through one or more coaxial cables, twisted pair cables, or fiber optic cables. Although the illustrated communications network 100 is shown with certain components and described with certain functionality herein, other embodiments of the communications network may include fewer or more components to implement the same, less, or more functionality. For example, the communications network may include at least one actuator and/or at least one display. In another example, in some embodiments, the communications network may include more than eighteen sensor nodes or less than eighteen sensor nodes, more than ten communications nodes or less than ten communications nodes, and/or more than two ECUs or less than two ECUs. In another example, although the sensor nodes, the communications nodes, and the ECUs are shown in FIG. 1 as being connected in certain topology, the network topology of the communications network is not limited to the topology shown in FIG. 1. Examples of network topology that can also be used by the communications network includes, without being limited to, point-to-point, star, bus, ring or circular, mesh, tree, or hybrid. For example, the sensor nodes, the communications nodes, and the ECUs can communicate through a communications bus, which carries analog differential signals and includes a high bus line and a low bus line, which may be connected between one or more resistors. In another example, two of the sensor nodes, the communications nodes, and/or the ECUs are connected by a point-to-point connection without any intervening device.

In the embodiment depicted in FIG. 1, the sensor nodes 104-1, 104-2, . . . , 104-18 are configured to sense environmental or operational parameters or data, for example, within a vehicle and/or surrounding a vehicle. In some embodiments, the sensor nodes are configured to sense environmental or operational parameters or data within an automotive system (e.g., a vehicle) and/or surrounding an automotive system. The environmental or operational parameters or data gathered by the sensor nodes can be in any suitable format. Examples of the sensor nodes include, without being limited to, image sensors/cameras, video sensors/cameras, capacitance sensors, inductive sensors, pressure sensors, thermal or temperature sensors (e.g., infra-red thermometers), position sensors (e.g., altimeters, gyroscopes, LiDAR sensors), proximity or presence sensors (e.g., motion detectors, radars (e.g., Doppler radars)), vibration sensors, acoustic sensors, optical sensors, moisture sensors, humidity sensors, fluid property sensors (e.g., flow sensors), voltage sensors, current sensors, and chemical sensors. In some embodiments, the sensor nodes are automotive sensors, such as air flow meters, air-fuel ratio meters, blind spot monitors, crankshaft position sensors, engine coolant temperature sensors, hall effect sensors, wheel speed sensors, airbag sensors, automatic transmission speed sensors, brake fluid pressure sensors, camshaft or crankshaft position sensors, cylinder head temperature gauges, engine pressure sensors, exhaust gas temperature sensors, fuel level sensors, fuel pressure sensors, light sensors, oil level sensors, oxygen sensors, radars, speed sensors, throttle position sensors, tire pressure sensors, torque sensors, transmission fluid temperature sensors, turbine speed sensors, variable reluctance sensors, wheel speed sensors, anti-lock braking system (ABS) sensors and/or battery sensors. Although the sensor nodes are illustrated in FIG. 1 as being certain types of sensors (e.g., cameras C1, C2, C3, C4, C5, C6, C7, C8, and C9, and radars R1, R2, R3, R4, R5, R6, R7, R8, and R9), in other embodiments, the sensor nodes are implemented as other types of sensors.

In the embodiment depicted in FIG. 1, the communications nodes 106-1, 106-2, . . . , 106-10 are configured to transmit and receive data. The data transmitted and received by the communications nodes can be in any suitable format. In an embodiment, the data transmitted and received are data frames. In addition to communication, each of the communications nodes may be configured to perform an application such as an automotive application. In some embodiments, at least one of the communications nodes is implemented as a switch or a daisy chain node that can be serially connected with other daisy chain node to form a daisy chain network. In the daisy chain network, data is serially transmitted uplink or downlink through daisy chain nodes. For example, when a first daisy chain node receives data from a second daisy chain node, the first daisy chain node can forward the received data to a third daisy chain node. Although the communications network is illustrated in FIG. 1 as including ten communications nodes, in other embodiments, the communications network includes more than ten communications nodes or less than ten communications nodes.

In the embodiment depicted in FIG. 1, the ECUs 108-1, 108-2 are configured to control one or more devices, such as the sensor nodes 104-1, 104-2, . . . , 104-18 and/or the communications nodes 106-1, 106-2, . . . , 106-10, and/or process data received from one or more devices, such as the sensor nodes 104-1, 104-2, . . . , 104-18 and/or the communications nodes 106-1, 106-2, . . . , 106-10. The ECUs can be used in various applications, such as automotive applications, communications applications, industrial applications, medical applications, computer applications, and/or consumer or appliance applications. In some embodiments, the ECUs 108-1, 108-2 are configured to control one or more electronic components within an automobile system such as a vehicle. Each ECU may collect data from one or more sensor nodes, run application software, control one or more actuators, and/or communicate to other ECU via the communication network. In these embodiments, the ECUs include at least one engine control module (ECM), at least one power train control module (PCM), at least one airbag, at least one antilock brake, at least one cruise control module, at least one electric power steering module, at least one audio system module, at least one window control module, at least one door control module, at least one mirror adjustment module, and/or at least one battery and/or recharging system for electrical or hybrid automotive systems. Although the communications network is illustrated in FIG. 1 as including two ECUs, in other embodiments, the communications network includes more than two ECUs or less than two ECUs.

In the embodiment depicted in FIG. 1, the eighteen sensor nodes 104-1, 104-2, . . . , 104-18 communicate according to various communications protocols, such as, Universal Serial Bus (USB), media-independent interface (MII) (e.g., reduced media-independent interface (RMII), gigabit media-independent interface (GMII), reduced gigabit media-independent interface (RGMII), 10-gigabit media-independent interface (XGMII) and serial gigabit media-independent interface (SGMII), etc., referred to collectively as "xMII"), Camera Serial Interface (CSI), and High-Definition Multimedia Interface (HDMI). The ECUs 108-1, 108-2 communicate according to xMII and Display Serial Interface (DSI) protocols. However, protocols according to which the sensor nodes and the ECUs communicate are not limited to the protocols shown in FIG. 10. Examples of the protocols according to which the sensor nodes and the ECUs communicate include, without being limited to, USB, xMII, CSI, Camera Serial Interface 2 (CSI-2), HDMI, DSI, Inter-integrated Circuit (I$^2$C) Protocol, Ethernet, Serial Peripheral Interface (SPI), and general-purpose input/output (GPIO). In some embodiments, each communications device within the communications network 100 is assigned a unique address. For example, each of the sensor nodes 104-1, 104-2, . . . , 104-18, the communications nodes 106-1, 106-2, . . . , 106-10, and the ECUs 108-1, 108-2 is assigned a unique address. In some embodiments, communications devices within the communications network 100 are assigned to cluster and each cluster is assigned a unique address.

In the embodiment depicted in FIG. 1, communications between the sensor nodes 104-1, 104-2, . . . , 104-18, the communications nodes 106-1, 106-2, . . . , 106-10, and the ECUs 108-1, 108-2 can be characterized as "symmetrical" or "asymmetrical." In symmetrical communications, both communications devices transmit and receive data at the same data rate. For example, in an Ethernet-based point-to-point network both communications devices transmit and receive at, for example, 10 Gbps. In asymmetrical communications, communications in one direction, e.g., on the forward channel, occur at a higher rate than in the other direction, e.g., on the backward channel. For example, a high data rate is needed from one of the sensor nodes to a corresponding communications node or a corresponding ECU (e.g., the forward channel) but a much lower data rate is needed from a corresponding communications node or a corresponding ECU to one of the sensor nodes (e.g., the backward channel). An example use case for asymmetrical communications in an IVN may be a camera (e.g., a backup camera), where a high data rate is needed from the camera to a control/display ECU (e.g., the forward channel) but a much lower data rate is needed from the control/display ECU to the camera (e.g., the backward channel). For example, a high data rate is needed from the camera, C1, to the communication node 106-1 (e.g., the forward channel of a communications link 118-1) but a much lower data rate is needed from the communication node 106-1 to the camera, C1, (e.g., the backward channel of the communications link 118-1) and a high data rate is needed from the communication node 106-2 to the ECU 108-1 (e.g., the forward channel of a communications link 118-2) but a much lower data rate is needed from the ECU 108-1 to the communication node 106-2 (e.g., the backward channel of the communications link 118-2). Another example use case for asymmetrical communications in an IVN may be a LiDAR sensor or a radar, where a high data rate is needed from the LiDAR sensor or the radar to a control/display ECU (e.g., the forward channel) but a much lower data rate is needed from the control/display ECU to the LiDAR sensor or the radar (e.g., the backward channel). For example, a high data rate is needed from the radar, R1, to the communication node 106-3 (e.g., the forward channel of a communications link 118-3) but a much lower data rate is needed from the communication node 106-3 to the radar, R1, (e.g., the backward channel of the communications link 118-3) and a high data rate is needed from the communication node 106-3 to the ECU 108-3 (e.g., the forward channel of a communications link 118-4) but a much lower data rate is needed from the ECU 108-2 to the communication node 106-3, (e.g., the backward channel of the communications link 118-4).

Figure 2:
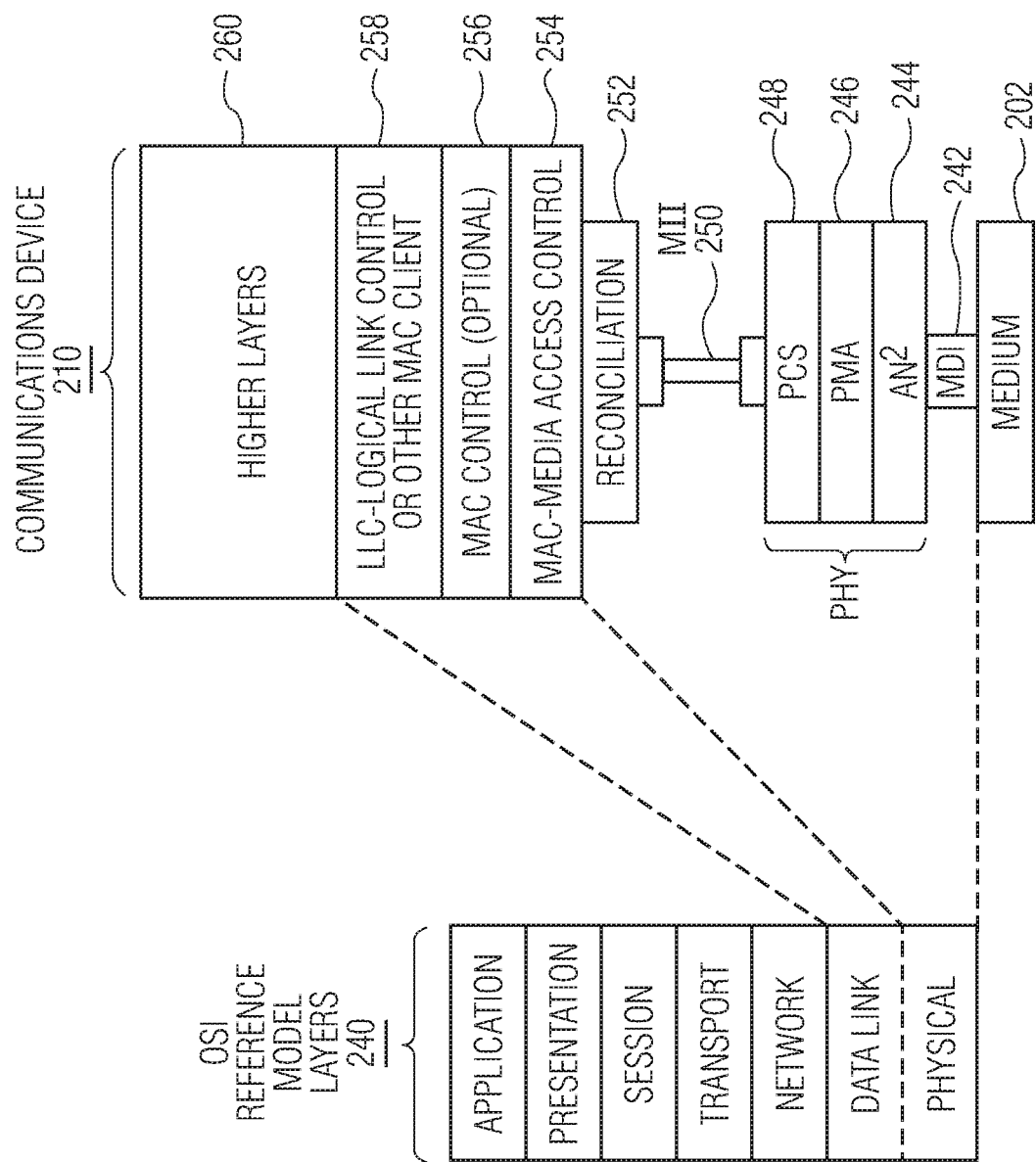
FIG. 2 depicts a communications node and an OSI reference model.

FIG. 2 illustrates a communications device 210 that can be used in the communications network 100. FIG. 2 also depicts the layers of the OSI reference model 240 as well as an expanded view of the physical layer and the data link layer. The communications device depicted in FIG. 2 is an embodiment of the sensor nodes 104-1, 104-2, . . . , 104-18, the communications nodes 106-1, 106-2, . . . , 106-10, and/or the ECUs 108-1, 108-2 depicted in FIG. 1. However, the sensor nodes, the communications nodes, and/or the ECUs depicted in FIG. 1 are not limited to the embodiment shown in FIG. 2. As shown in FIG. 2, the OSI reference model includes the physical layer (also referred to as layer 1 or L1), the data link layer (also referred to as layer 2 or L2), the network layer (also referred to as layer 3 or L3), the transport layer (also referred to as layer 4 or L4), the session layer (also referred to as layer 5 or L5), the presentation layer (also referred to as layer 6 or L6), and the application layer (also referred to as layer 7 or L7). Elements in the expanded view of the physical layer include media-dependent sublayers of a transmission medium or media 202, a media-dependent interface (MDI) 242, an auto-negotiation layer (AN2) 244, a physical medium attachment (PMA) 246, and a physical coding sublayer (PCS) 248, and media-independent sublayers of a media-independent interface (MII) 250 (e.g., reduced media-independent interface (RMII), gigabit media-independent interface (GMII), reduced gigabit media-independent interface (RGMII), 10-gigabit media-independent interface (XGMII) and serial gigabit media-independent interface (SGMII), etc., referred to collectively as "xMII"), and a reconciliation sublayer 252. In an embodiment, elements of the PCS, PMA, and AN2 are included in a physical layer chip, often referred to as a "PHY chip" and or simply as a "PHY" as indicated in FIG. 2. Elements in the expanded view of the data link layer include a media access control (MAC) layer 254, an optional MAC control layer 256, and a logical link control (LLC) 258, or other MAC client layer. Higher layers 260 may be implemented above the data link layer.

Figure 3:
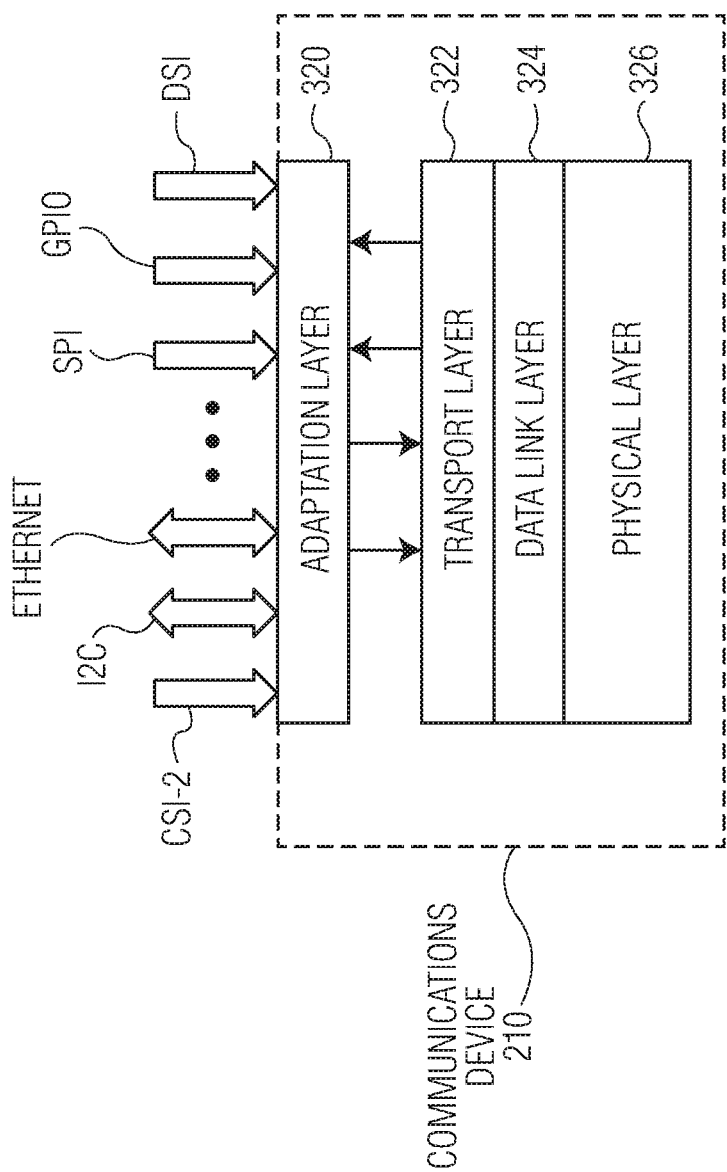
FIG. 3 illustrates a tunneling technique of the communications device depicted in FIG. 2.

FIG. 3 illustrates a tunneling technique of the communications device 210 depicted in FIG. 2. As illustrated in FIG. 3, an adaptation layer 320 within the communications device 210 allows data in different protocol formats to tunnel through the communications device by generating packets for all supported protocol formats. In some embodiments, the adaptation layer fragments each received data frame or packet if necessary, assigns a protocol type for each fragment, and assigns a packet counter field start and end value to each protocol type. For example, the adaptation layer can assign to protocol type CSI-2 a packet counter field that starts from 0 to 10, protocol type $I^2C$ a packet counter field that starts from 11 to 20, and protocol type DSI a packet counter field that starts from 21 to 30. In some embodiments, the functionality of the adaptation layer is implemented in hardware (e.g., circuits), software, firmware, or a combination thereof. Examples of protocol formats that can be supported by the adaption layer include, without being limited to, CSI, CSI-2, $I^2C$ Protocol, Ethernet, SPI, GPIO), and DSI. Transport layer 322 forwards packets from the adaptation layer to the data link layer. Data link layer 324 checks for error in received packets and establishes a communications links with a partner device using, for example, Start of Packet (SoP) and End of Packet (EoP) signals. Physical layer 326 transmits and receives data from other devices.

Figure 4:
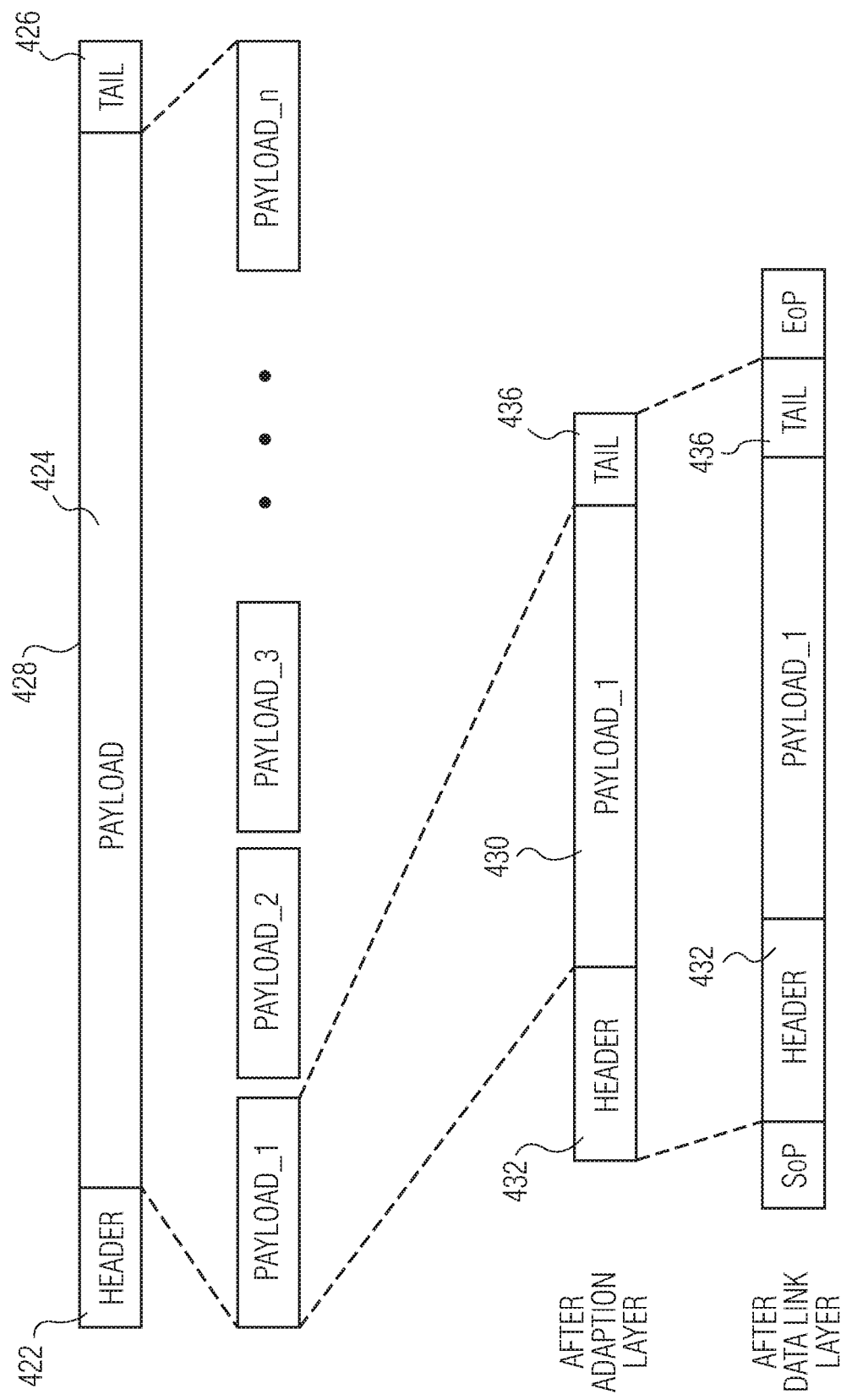
FIG. 4 illustrates a packet generation operation that can be performed by the communications device depicted in FIG. 2 using the tunneling technique illustrated in FIG. 3.

FIG. 4 illustrates a packet generation operation that can be performed by the communications device 210 depicted in FIG. 2 using the tunneling technique illustrated in FIG. 3. As illustrated in FIG. 4, payload 424 of a data structure 428 (also includes a header 422 and a tail section 426) that is transmitted, generated, and/or encoded according to a certain protocol (e.g., in a certain protocol format) is packaged into a packet 430 with a header 432 and a tail section 436. Examples of information that can be included in the header or the tail section include, without being limited to, protocol type information, address information, packet counter, priority information and error-detecting code (e.g., cyclic redundancy check (CRC)). For example, each payload segment, payload_1, payload_2, payload_3, . . . , or payload_N (where N is an integer greater than 1) of the data structure 428 (e.g., a frame according to CSI-2, $I^2C$, Ethernet, SPI, GPIO, or DSI), is re-packaged by the adaptation layer 320 with the header 432 and the tail section 436 to generate the packet 430. At the data link layer 324, SoP and EoP values are inserted into the packet 430 that is generated by the adaptation layer.

Turning back to FIG. 1, link error detection techniques can be used in the communications network 100 to detect communications link errors within the communications network. However, typical network technology such as complex error detection schemes using large parity check bits may increase communications overhead for communications networks with limited resources. In accordance with an embodiment of the invention, a method of communications involves at a communications device, detecting an erroneously transmitted packet based on a communications protocol associated with the erroneously transmitted packet, and from the communication device, notifying a wired communications network of the erroneously transmitted packet. By detecting an erroneously transmitted packet based on a communications protocol associated with the erroneously transmitted packet and notifying a wired communications network of the erroneously transmitted packet, a link error within the wired communications network can be diagnosed with low communications overhead. Consequently, power consumption and communications overhead of the wired communications network can be reduced.

Figure 5:
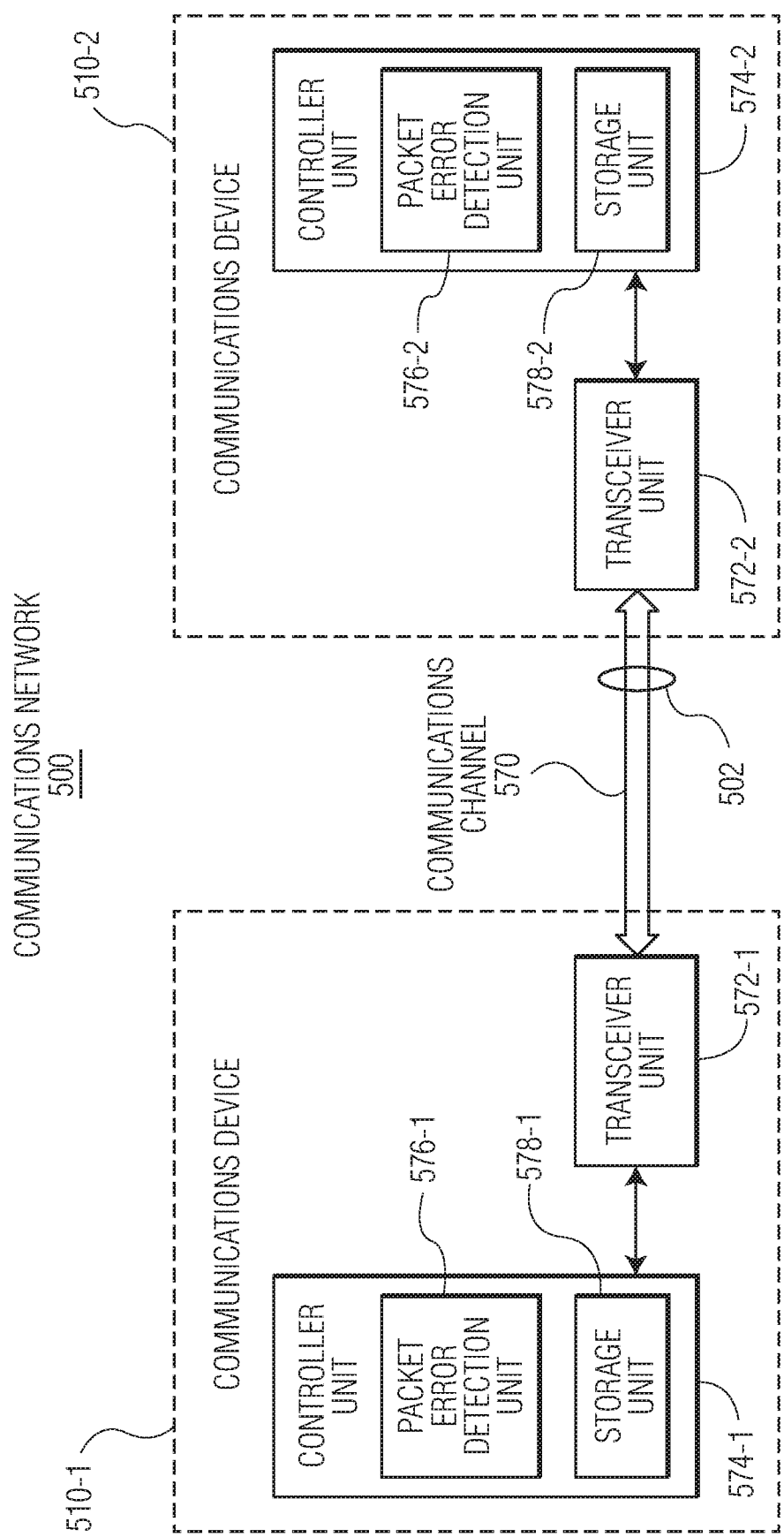
FIG. 5 depicts a communications network that includes communication devices.

FIG. 5 depicts a communications network 500 that includes communication devices 510-1, 510-2. In the embodiment depicted in FIG. 5, the communication device 510-1 includes a transceiver unit 572-1 and a controller unit 574-1, which includes a packet error detection unit 576-1 and an optional storage unit 578-1. The communication device 510-2 includes a transceiver unit 572-2 and a controller unit 574-2, which includes a packet error detection unit 576-2 and an optional storage unit 578-2. The communication devices 510-1, 510-2 communicate through a communications channel 570 over a transmission medium 502, such as an electrical cable or wire, which is made of one or more conductive materials (e.g., metals). In some embodiments, the communications channel 570 is a symmetrical communications channel in which both communications devices 510-1, 510-2 transmit and receive data at the same data rate. In other embodiments, the communications channel 570 is an asymmetrical communications channel in which communications devices 510-1, 510-2 transmit and receive data at different data rates (e.g., communications in one direction of the communications channel, e.g., on the forward channel, occur at a higher rate than in the other direction of the communications channel, e.g., on the backward channel). The communication devices 510-1, 510-2 depicted in FIG. 5 are embodiments of the sensor nodes 104-1, 104-2, . . . , 104-18, the communications nodes 106-1, 106-2, . . . , 106-10, and/or the ECUs 108-1, 108-2 depicted in FIG. 1. However, the sensor nodes, the communications nodes, and/or the ECUs depicted in FIG. 1 are not limited to the embodiment shown in FIG. 5. Although the illustrated communication devices 510-1, 510-2 are shown with certain components and described with certain functionality herein, other embodiments of the communication devices 510-1, 510-2 may include fewer or more components to implement the same, less, or more functionality. In addition, although the transceiver units, the controller units, the storage units, and the packet generation units are shown in FIG. 5 as being connected in certain manner within the communication devices 510-1, 510-2, in other embodiments, the transceiver units, the storage units, and the packet generation units are connected in a different manner as shown in FIG. 5.

In the communication device 510-1 depicted in FIG. 5, the transceiver unit 572-1 is configured to transmit and/or receive data from the transceiver unit 572-2 of the communication device 510-2 through the communications channel 570. The controller unit 574-1 is configured to perform data processing and other control function (e.g., packet generation) for the communication device 510-1. In an embodiment, the controller unit is implemented within a processor, such as a microcontroller, a host processor, a host, a digital signal processor (DSP), or a central processing unit (CPU). The packet error detection unit 576-1 is configured to detect a received packet error the communication device 510-1. In some embodiments, the packet error detection unit is configured to detect an erroneously transmitted packet based on a communications protocol associated with the erroneously transmitted packet and to notify the communications network 500 (e.g., the communication device 510-2) of the erroneously transmitted packet. By detecting an erroneously transmitted packet based on a communications protocol associated with the erroneously transmitted packet and notifying the communications network of the erroneously transmitted packet, a link error within the communications network (e.g., a link failure of the communications channel 570) can be diagnosed with low communications overhead. Consequently, power consumption and communications overhead of the communications network can be reduced. The packet error detection unit may be implemented in hardware (e.g., circuits), software, firmware, or a combination thereof. The storage unit 578-1 is configured to store information that can be used for packet error detection and/or other information. For example, in an embodiment, the storage unit 578-1 is configured to store a lookup table of communications protocol(s) and/or other communications parameter(s) associated with data packets received at the communications device 510-1 (e.g., packets of which the communications device 510-1 is the intended recipient). The storage unit 578-1 can be implemented by various types of storage elements. Examples of the storage unit 578-1 includes, without being limited to, a semiconductor or solid-state memory (e.g., a random-access memory (RAM) or a read-only memory (ROM)), magnetic tape, a computer hard disk, a flash drive, a removable computer diskette, a rigid magnetic disk, and an optical disk.

In the communication device 510-2 depicted in FIG. 5, the transceiver unit 572-2 is configured to transmit and/or receive data from the transceiver unit 572-1 of the communication device 510-1 through the communications channel 570. The controller unit 574-2 is configured to perform data processing and other control function (e.g., packet generation) for the communication device 510-2. In an embodiment, the controller unit is implemented within a processor, such as a microcontroller, a host processor, a host, a DSP, or a CPU. The packet error detection unit 576-2 is configured to detect a received packet error the communication device 510-2. In some embodiments, the packet error detection unit is configured to detect an erroneously transmitted packet based on a communications protocol associated with the erroneously transmitted packet and to notify the communications network 500 (e.g., the communication device 510-1) of the erroneously transmitted packet. By detecting an erroneously transmitted packet based on a communications protocol associated with the erroneously transmitted packet and notifying the communications network of the erroneously transmitted packet, a link error within the communications network (e.g., a link failure of the communications channel 570) can be diagnosed with low communications overhead. Consequently, power consumption and communications overhead of the communications network can be reduced. The packet error detection unit may be implemented in hardware (e.g., circuits), software, firmware, or a combination thereof. The storage unit 578-2 is configured to store information that can be used for packet error detection and/or other information. For example, in an embodiment, the storage unit 578-2 is configured to store a lookup table of communications protocol(s) and/or other communications parameter(s) associated with data packets received at the communications device 510-1 (e.g., packets of which the communications device 510-2 is the intended recipient). The storage unit 578-1 can be implemented by various types of storage elements. Examples of the storage unit 578-1 includes, without being limited to, a semiconductor or solid-state memory (e.g., a random-access memory (RAM) or a read-only memory (ROM)), magnetic tape, a computer hard disk, a flash drive, a removable computer diskette, a rigid magnetic disk, and an optical disk.

Figure 6:
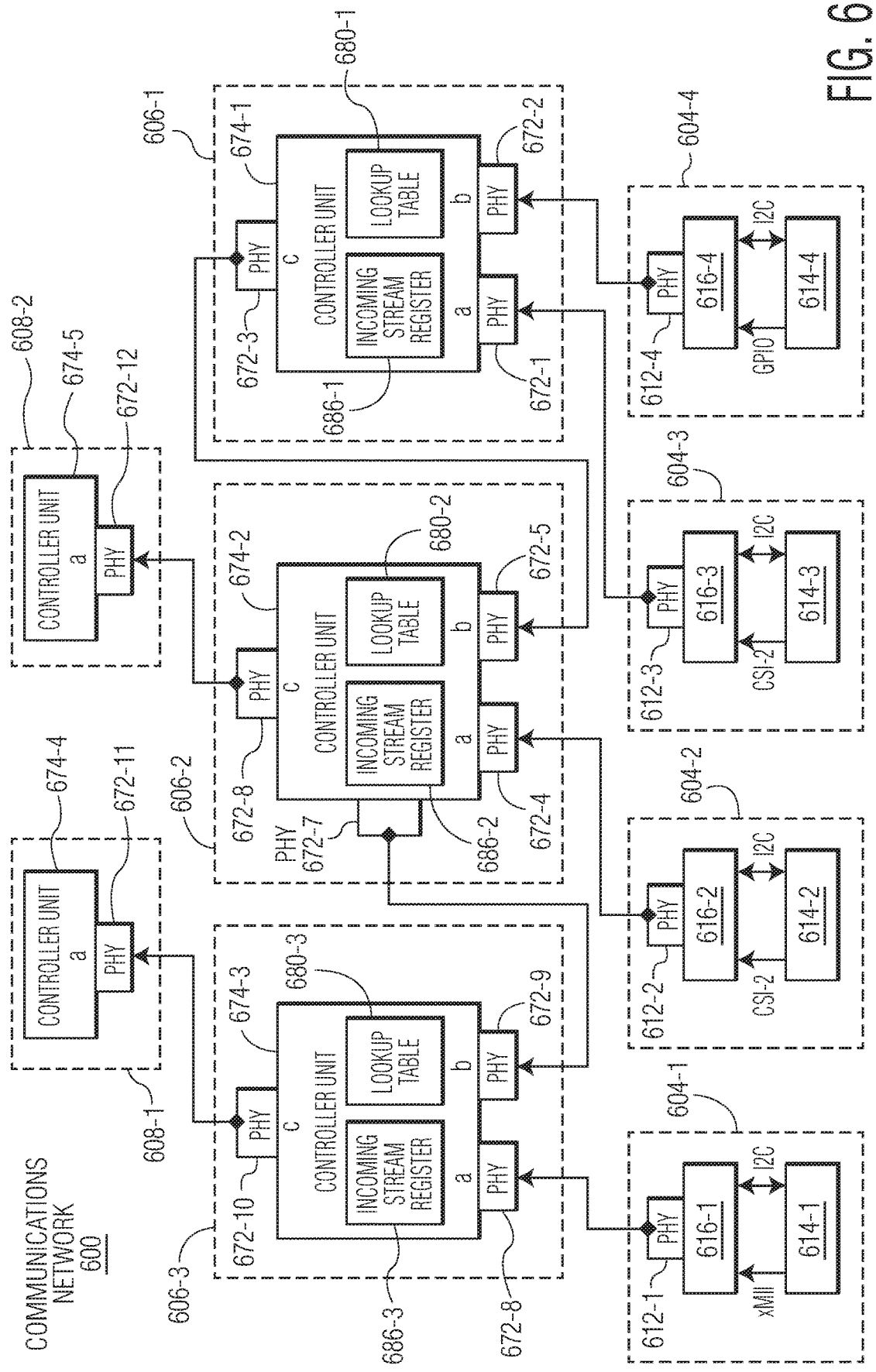
FIG. 6 depicts a communications network that implements a packet error detection technique.

FIG. 6 depicts a communications network 600 that includes multiple sensor nodes 604-1, 604-2, 604-3, 604-4, communications nodes 606-1, 606-2, 606-3, and ECUs 608-1, 608-2 and that implements a packet error detection technique. The communications network can be used in various applications, such as automotive applications, communications applications, industrial applications, medical applications, computer applications, and/or consumer or appliance applications. In the embodiment depicted in FIG. 6, the communications network is a wired communications network and the sensor nodes, the communications nodes, and the ECUs communicate through electrical cables or wires, which are made of conductive materials (e.g., metals). Although the illustrated communications network 600 is shown with certain components and described with certain functionality herein, other embodiments of the communications network may include fewer or more components to implement the same, less, or more functionality. For example, the communications network may include at least one actuator and/or at least one display. In another example, in some embodiments, the communications network may include different number of sensor node(s), communications node(s), and/or ECU(s) as shown in FIG. 6 and may have a different network topology as in FIG. 6.

In the embodiment depicted in FIG. 6, each sensor node 604-1, 604-2, 604-3, or 604-4 includes a transceiver unit (PHY) 612-1, 612-2, 612-3, or 612-4 configured to transmit and/or receive data packets, a sensor unit 614-1, 614-2, 614-3, or 614-4 configured to sense one or more environmental or operational parameters or data, for example, within an automotive system (e.g., a vehicle) and/or surrounding an automotive system (e.g., a vehicle), and a control unit 616-1, 616-2, 616-3, or 616-4 configured to control the corresponding sensor unit, process sensor data, and/or process control data. The sensor nodes 604-1, 604-2, 604-3, 604-4 can be controlled and/or communication in various protocols. For example, the sensor nodes can be controlled by control data in I²C format from the communications nodes 606-1, 606-2, 606-3, and ECUs 608-1, 608-2 and transmit data in xMII, CSI-2, and GPIO formats to the communications nodes 606-1, 606-2, 606-3, and ECUs 608-1, 608-2. However, protocol formats that can be supported by the sensor nodes are not limited to the protocol formats shown in FIG. 6.

In the embodiment depicted in FIG. 6, each of the communications nodes 606-1, 606-2, 606-3 includes a controller unit 674-1, 674-2, or 674-3 configured to perform data processing and other control function (e.g., packet generation), for example, based on a lookup table 680-1, 680-2, or 680-3. The communications nodes 606-1, 606-2, 606-3 may be implemented as daisy chain nodes. In addition, the communications node 606-1 includes transceiver unit (PHY) 672-1, 672-2, 672-3 connected to ports (a), (b), and (c) of the communications node 606-1 and configured to transmit and/or receive data packets through ports (a), (b), and (c), respectively, of the communications node 606-1. The communications node 606-2 includes transceiver unit (PHY) 672-4, 672-5, 672-6, 672-7 connected to ports (a), (b), (c), and (d) of the communications node 606-2 and configured to transmit and/or receive data packets through ports (a), (b), (c), and (d) respectively, of the communications node 606-2. The communications node 606-3 includes transceiver unit (PHY) 672-8, 672-9, 672-10 connected to ports (a), (b), and (c) of the communications node 606-3 and configured to transmit and/or receive data packets through ports (a), (b), and (c), respectively, of the communications node 606-3. However, number(s) of port(s) and/or transceiver(s) of the communications nodes 606-1, 606-2, 606-3 are not limited to numbers of ports and transceivers shown in FIG. 6.

In the embodiment depicted in FIG. 6, each of the ECUs 608-1, 608-2 includes a controller unit 674-4, 674-5 configured to perform data processing and other control function (e.g., packet generation) and a transceiver unit (PHY) 672-11 or 672-12 connected to port (a) of the ECU 608-1 or 608-2 and configured to transmit and/or receive data packets through port (a) of the ECU 608-1 or 608-2. However, number(s) of port(s) and/or transceiver(s) of the ECUs 608-1, 608-2 are not limited to numbers of ports and transceivers shown in FIG. 6.

In the embodiment depicted in FIG. 6, each of the communications nodes 606-1, 606-2, 606-3 maintains the lookup table 680-1, 680-2, or 680-3, which may include information such as protocol type, packet counter, and address (e.g., destination address and/or source address) of data packets to be transmitted the communications node. Each of the controller units 674-1, 674-2, 674-3 may be configured to detect an erroneously transmitted packet based on information stored in a respective lookup table. In some embodiments, each of the controller units 674-1, 674-2, 674-3 is configured to detect an erroneously transmitted packet based on a communications protocol associated with the erroneously transmitted packet and to notify the communications network 600 of the erroneously transmitted packet. By detecting an erroneously transmitted packet based on a communications protocol associated with the erroneously transmitted packet and notifying the communications network of the erroneously transmitted packet, a link error within the communications network (e.g., a link failure between an ECU and an communications node, a link failure between communications nodes, or a link failure between a communications node and a sensor node) can be diagnosed with low communications overhead. Consequently, power consumption and communications overhead of the communications network can be reduced. For example, protocol type CSI-2 may be assigned a code or identifier 0x01, protocol type I²C may be assigned a code or identifier 0x02, protocol type xMII may be assigned a code or identifier 0x03, and protocol type GPIO may be assigned a code or identifier 0x04. Packet counter value for protocol type CSI-2 may be assigned a range of 0x00 to 0x10, packet counter value for protocol type I²C may be assigned a range of 0x11 to 0x13, packet counter value for protocol type xMII may be assigned a range of 0x14 to 0x29, and packet counter value for protocol type GPIO may be assigned a range of 0x30 to 0x35. When the communications node 606-1 or 606-2 receives a packet with protocol type 0x03 or packet counter value that falls in range 0x14 to 0x29, an erroneously transmitted packet is detected because only the sensor node 604-1 generates data in xMII format and the sensor node 604-1 is not connected to either of the communications nodes 606-1, 606-2. In some embodiments, each of the communications nodes 606-1, 606-2, 606-3 includes a incoming stream register 686-1, 686-2, or 686-3 that is configured to store information (e.g., addresses (e.g., destination addresses and/or source addresses), packet counter values, and protocol types of received packets.)

In some embodiments, each of the communications nodes 606-1, 606-2, 606-3 updates the lookup table 680-1, 680-2, or 680-3 periodically. For example, each of the communications nodes 606-1, 606-2, 606-3 updates the corresponding lookup table 680-1, 680-2, or 680-3 to add a new entry in First-in-Last-Out manner. Once the communications node 606-1, 606-2, or 606-3 detects an erroneously transmitted packet, the communications node may set a local status register to indicate that the received packet is erroneously transmitted and notify a link partner that the received packet is erroneously transmitted. In some embodiments, the communications node 606-1, 606-2, or 606-3 notifies a link partner through an operations, administration, and management (OAM) packet or frame.

Figure 7:
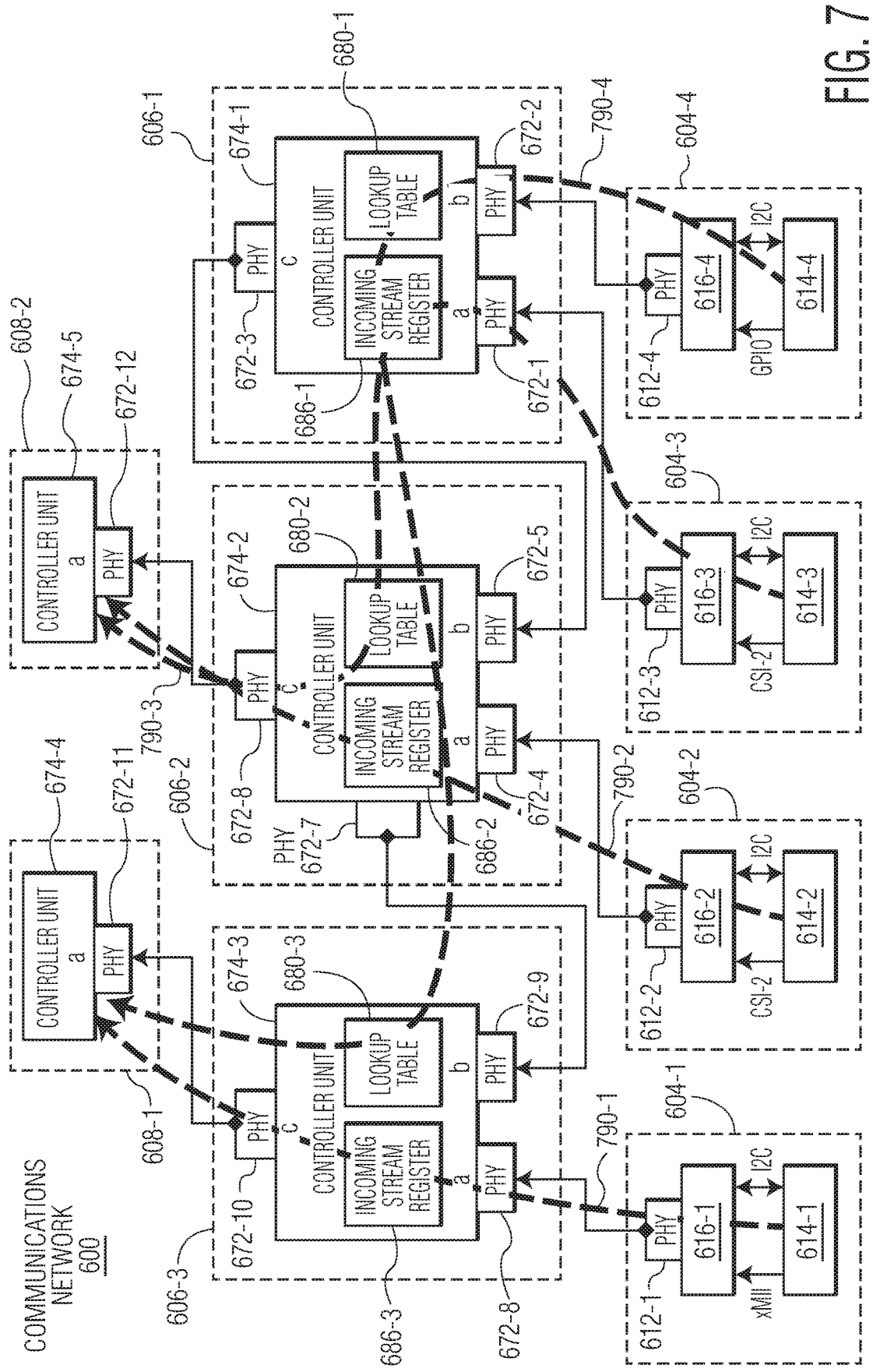
FIG. 7 depicts four proper or correct (error-free) communications paths in the communications network depicted in FIG. 6.

FIG. 7 depicts four proper or correct (error-free) communications paths 790-1, 790-2, 790-3, 790-4 between the sensor nodes 604-1, 604-2, 604-3, 604-4 and ECUs 608-1, 608-2 of the communications network 600 depicted in FIG. 6. The communications nodes 606-1, 606-2, 606-3 and/or the ECUs 608-1, 608-2 check packets received from the sensor nodes 604-1, 604-2, 604-3, 604-4 against the lookup tables 680-1, 680-2, 680-3 or lookup tables of the ECUs 608-1, 608-2 and determines that packets from the sensor nodes 604-1, 604-2, 604-3, 604-4 are not erroneously transmitted, based on protocol type(s), packet counter values, and/or address information (e.g., destination address and/or source address) of the packets.

Figure 8:
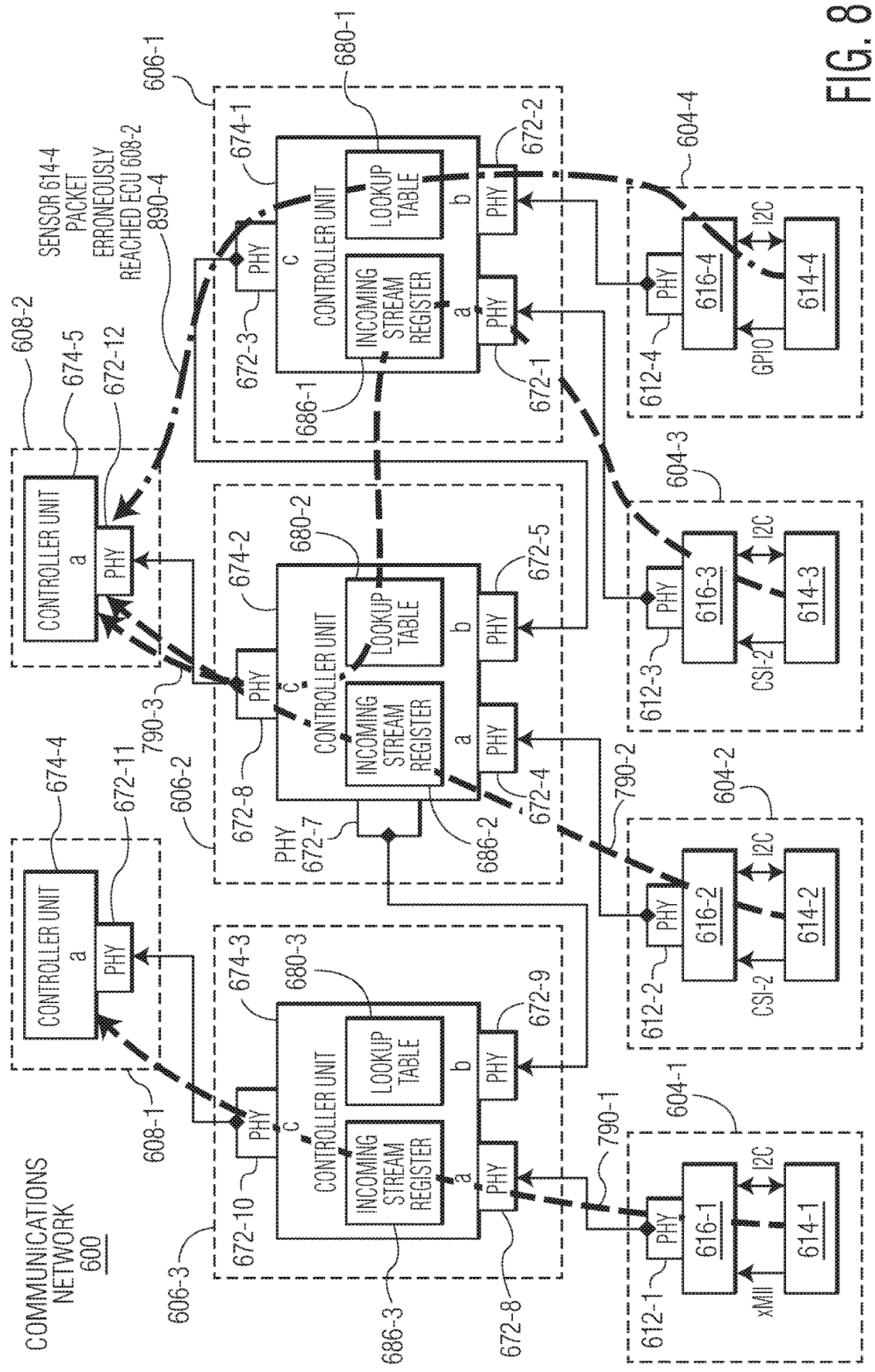
FIG. 8 depicts three proper or correct (error-free) communications paths and an incorrect or erroneous communications path in the communications network depicted in FIG. 6.

FIG. 8 depicts three proper or correct (error-free) communications paths 790-1, 790-2, 790-3, and an incorrect or erroneous communications path 890-4 between the sensor nodes 604-1, 604-2, 604-3, 604-4 and ECUs 608-1, 608-2 of the communications network 600 depicted in FIG. 6. The communications nodes 606-1, 606-2, 606-3 and/or the ECUs 608-1, 608-2 check packets received from the sensor nodes 604-1, 604-2, 604-3, 604-4 against the lookup tables 680-1, 680-2, 680-3 or lookup tables of the ECUs 608-1, 608-2. Specifically, the ECU 608-2 checks one or more packets received from the sensor node 604-4 through the erroneous communications path 890-4 against a lookup table that is stored locally at the ECU 608-2 and determines that packets from the sensor node 604-4 are erroneously transmitted, based on protocol type(s), packet counter values, and/or address information (e.g., destination address and/or source address) of the packets. For example, a GPIO packet from the sensor node 604-4 is received by the ECU 608-2 and the ECU 608-2 determines that the GPIO packet is an erroneously transmitted packet because the ECU 608-2 should not receive GPIO packet based on its lookup table. The ECU 608-2 sets its internal status register to indicate the erroneously transmitted packet and notifies the communications node 606-2 through an OAM packet indicating that the packet received from the sensor node 604-4 is erroneously transmitted (i.e., the ECU 608-2 is not the intended recipient of the packet from the sensor node 604-4). The OAM packet may be transmitted between the transceiver units (PHYs) 672-12, 672-8 and may include protocol type, packet counter value, and/or address information (e.g., destination address and/or source address) of the packet erroneously transmitted from the sensor node 604-4. In some embodiments, each of the communications nodes 606-1, 606-2, 606-3 and the ECUs 608-1, 608-2 performs forward error correction (FEC) or cyclic redundancy check (CRC) on a received packet before or after determining whether the received packet is erroneously transmitted and stores the result in a local register.

After the communications node 606-2 receives an OAM notification packet from the ECU 608-2 indicating that the packet received from the sensor node 604-4 is erroneously transmitted (i.e., the ECU 608-2 is not the intended recipient of the packet from the sensor node 604-4), the communications node 606-2 checks the OAM notification packet against an "incoming stream register table" stored in its incoming stream register 686-2. If the content of the incoming stream register table at the communications node 606-2 is different from received parameters (e.g., protocol type, packet counter value, and/or address information (e.g., destination address and/or source address)) in the OAM notification packet from the ECU 608-2, it is determined that the link between the ECU 608-2 and the communications node 606-2 is erroneous (e.g., caused by one or more routing errors and/or one or more packet forwarding errors). However, if the content of the incoming stream register table at the communications node 606-2 is the same or similar to received parameters (e.g., protocol type, packet counter value, and/or address information (e.g., destination address and/or source address)) in the OAM notification packet from the ECU 608-2, it is determined that the link between the ECU 608-2 and the communications node 606-2 is error free, and the communications node 606-2 further notifies back to the communications node 606-2 and the sensor node 604-2 through an OAM notification packet about the packet erroneously transmitted to the ECU 608-2. The communications node 606-1 checks the OAM notification packet received from the communications node 606-2 against an "incoming stream register table" stored in its incoming stream register 686-1. If the content of the incoming stream register table at the communications node 606-1 is different from received parameters (e.g., protocol type, packet counter value, and/or address information (e.g., destination address and/or source address)) in the OAM notification packet from the communications node 606-2, it is determined that the link between the communications node 606-1 and the communications node 606-2 is erroneous (e.g., caused by one or more routing errors and/or one or more packet forwarding errors). However, if the content of the incoming stream register table at the communications node 606-1 is the same or similar to received parameters (e.g., protocol type, packet counter value, and/or address information (e.g., destination address and/or source address)) in the OAM notification packet from the communications node 606-2, it is determined that the link between the communications node 606-1 and the communications node 606-2 is error free, and the communications node 606-1 further notifies the sensor nodes 604-3, 604-4 through an OAM notification packet about the packet erroneously transmitted to the ECU 608-2.

Figure 9:
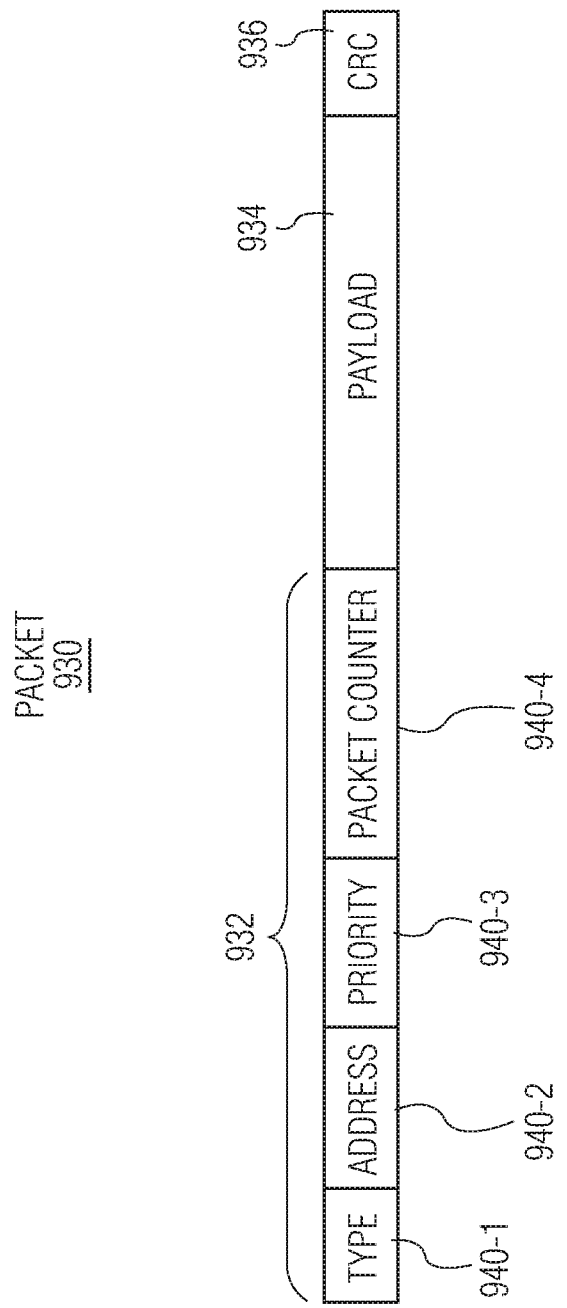
FIG. 9 depicts a packet that can be transmitted in the communications network depicted in FIG. 6.

FIG. 9 depicts a packet 930 that can be transmitted in the communications network 600 depicted in FIG. 6. The packet 930 can be generated, transmitted, and/or received and processed by the sensor nodes 604-1, 604-2, 604-3, 604-4, communications nodes 606-1, 606-2, 606-3, and/or ECUs 608-1, 608-2. As depicted in FIG. 9, the packet 930 includes a header 932, a payload 934, and a CRC 936. In the embodiment depicted in FIG. 9, the header of the packet includes a protocol type data field 940-1, an address data field 940-2, a priority data field 940-3, and a packet counter data field 940-4. The protocol type data field contains information that indicates a communications protocol under which the packet or the payload of the packet is transmitted, generated, and/or encoded (e.g., in a certain protocol format). The address data field contains address information (e.g., a source address and/or a destination address) to indicate a source and/or a destination of the packet. The priority data field contains information that indicates priority of the packet. The packet counter data field contains information that indicates a packet counter value or a packet sequence value, which can be used as a timestamp from a transmitting device or to determine if a particular packet is lost.

Figure 10:
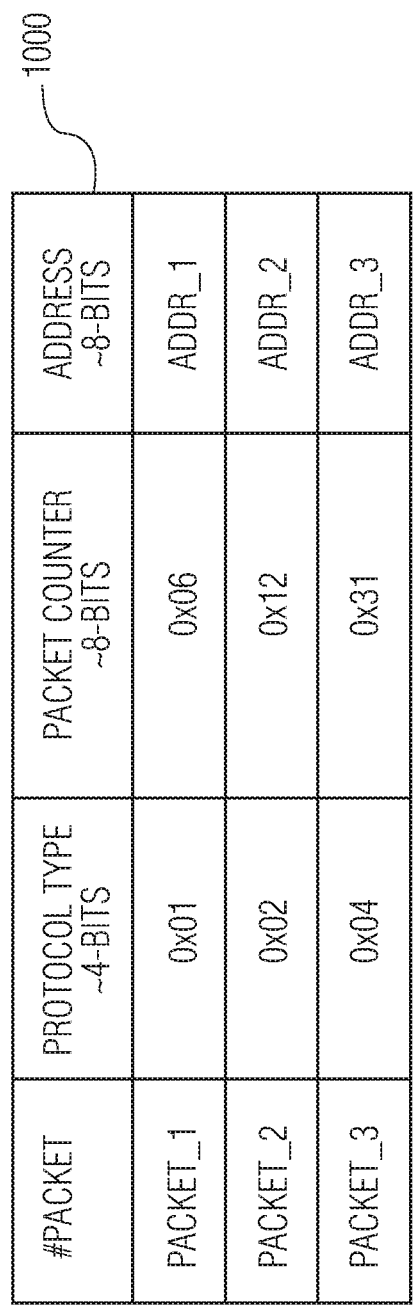
FIG. 10 depicts an example of an incoming stream register table that can be used by a communications node in the communications network depicted in FIG. 6.

FIG. 10 depicts an example of an incoming stream register table 1000 that can be used by the communications node 606-2 depicted in FIG. 6. As depicted in FIG. 10, the incoming stream register table contains protocols entries for three packets, packet_1, packet_2, packet_3. Specifically, packet_1 is in the CSI-2 format (0x01), has a packet counter value of 0x06, and has an address of Addr_1, packet_2 is in the I²C format (0x02), has a packet counter value of 0x12, and has an address of Addr_2, and packet_3 is in the GPIO format (0x04), has a packet counter value of 0x01, and has an address of Addr_3. Although certain number of entries and values are shown in the incoming stream register table of FIG. 10, in other embodiments, the incoming stream register table may contain different values and/or different number of entries.

Figure 11:
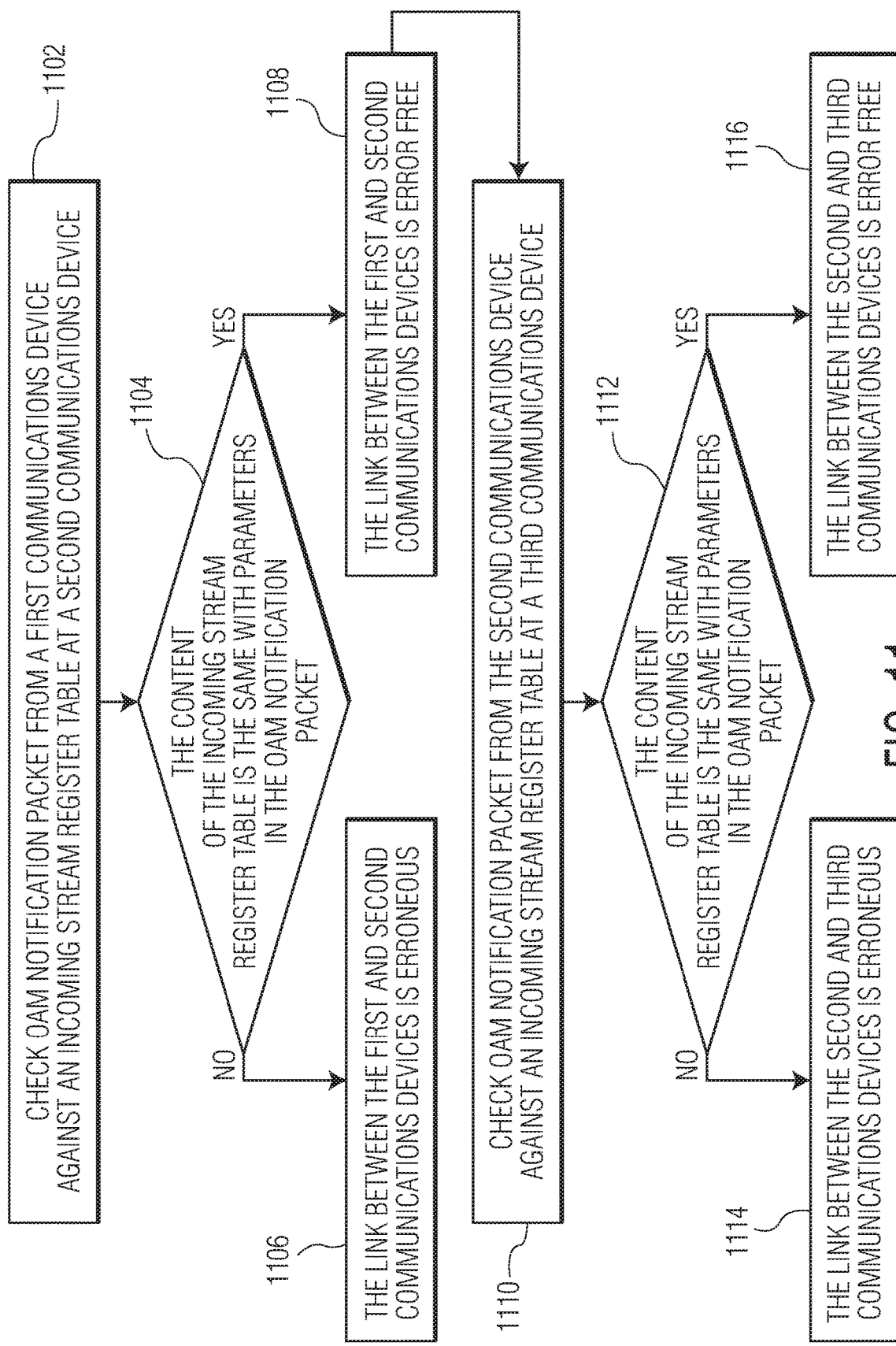
FIG. 11 is a flow diagram of an erroneous link diagnosing process in accordance with an embodiment of the invention.

FIG. 11 is a flow diagram of an erroneous link diagnosing process in accordance with an embodiment of the invention. The erroneous link diagnosing process can be performed by the sensor nodes 604-1, 604-2, 604-3, 604-4, communications nodes 606-1, 606-2, 606-3, and ECUs 608-1, 608-2 of the communications network 600 depicted in FIG. 6. At block 1102, a second communications device receives an OAM notification packet from a first communications device indicating that a packet is erroneously transmitted to the first communications device (i.e., the first communications device is not the intended recipient of the packet) and checks the OAM notification packet against an "incoming stream register table." At block 1104, it is determined if the content of the incoming stream register table at the second communications device is the same as received parameters (e.g., protocol type, packet counter value, and/or address information (e.g., destination address and/or source address)) in the OAM notification packet received from the first communications device.

Next, at block 1106, if/when the content of the incoming stream register table at the second communications device is different from received parameters (e.g., protocol type, packet counter value, and/or address information (e.g., destination address and/or source address)) in the OAM notification packet received from the first communications device, it is determined that the link between the first and second communications devices is erroneous (e.g., caused by one or more routing errors and/or one or more packet forwarding errors). At block 1108, if/when the content of the incoming stream register table at the second communications device is the same as received parameters (e.g., protocol type, packet counter value, and/or address information (e.g., destination address and/or source address)) in the OAM notification packet received from the first communications device, it is determined that the link between the first and second communications devices is error free, and the erroneous link diagnosing process goes to block 1100, and the second communications device further notifies a third communications device through an OAM notification packet about the packet erroneously transmitted to the first communications device.

At block 1110, a third communications device receives the OAM notification packet from the second communications device indicating that a packet is erroneously transmitted to the first communications device (i.e., the first communications device is not the intended recipient of the packet) and checks the OAM notification packet against an "incoming stream register table." At block 1112, it is determined if the content of the incoming stream register table at the third communications device is the same as received parameters (e.g., protocol type, packet counter value, and/or address information (e.g., destination address and/or source address)) in the OAM notification packet received from the second communications device.

Next, at block 1114, if/when the content of the incoming stream register table at the third communications device is different from received parameters (e.g., protocol type, packet counter value, and/or address information (e.g., destination address and/or source address)) in the OAM notification packet received from the second communications device, it is determined that the link between the second and third communications devices is erroneous (e.g., caused by one or more routing errors and/or one or more packet forwarding errors). At block 1108, if/when the content of the incoming stream register table at the third communications device is different from received parameters (e.g., protocol type, packet counter value, and/or address information (e.g., destination address and/or source address)) in the OAM notification packet received from the second communications device, it is determined that the link between the second and third communications devices is error free. The erroneous link diagnosing process may goes to additional steps in which the third communications device further notifies a fourth communications device through an OAM notification packet about the packet erroneously transmitted to the first communications device.

Figure 12:
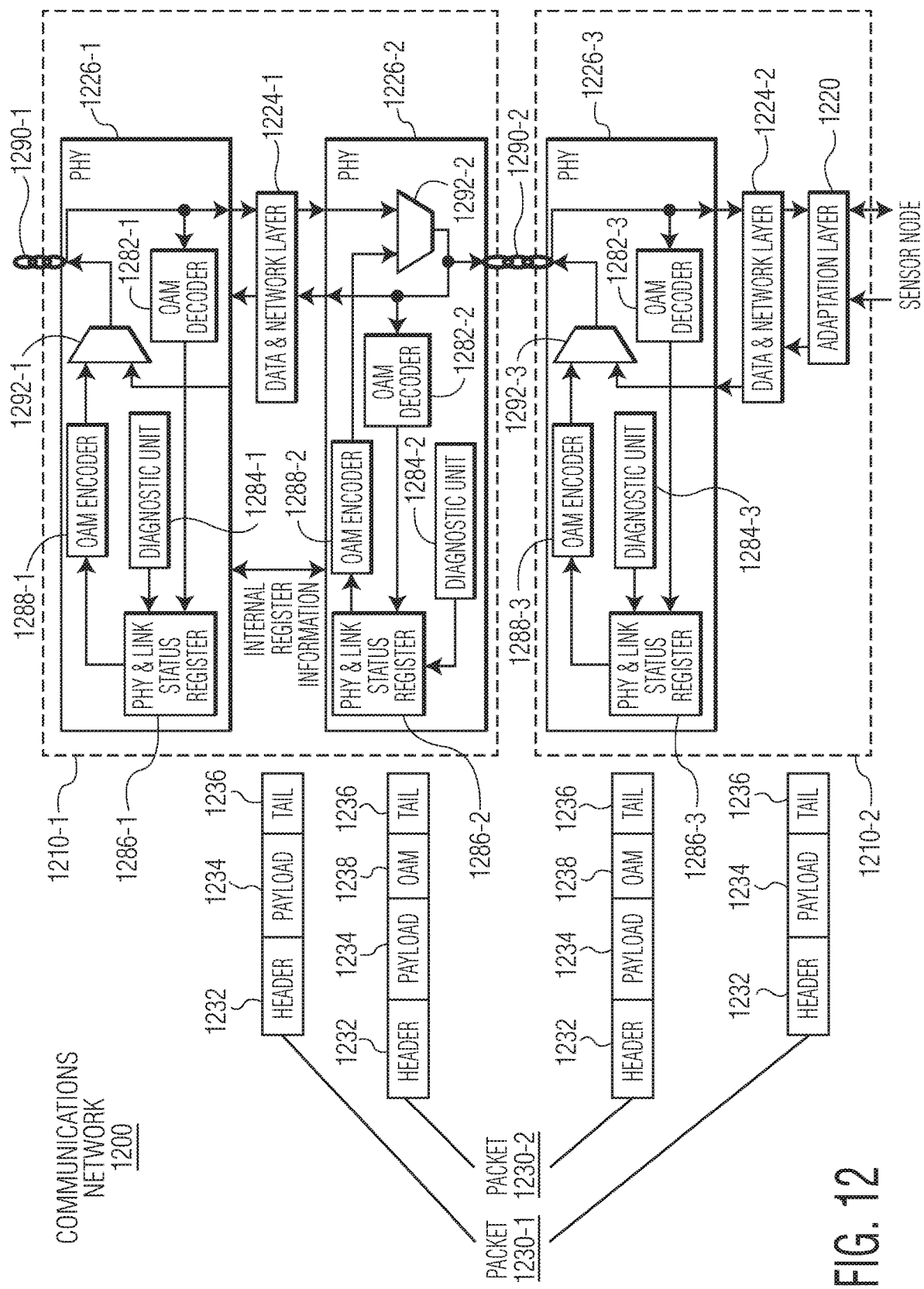
FIG. 12 depicts a communications network that implements an erroneous link diagnosing technique.

FIG. 12 depicts a communications network 1200 that includes two communications devices 1210-1, 1210-2 and that implements an erroneous link diagnosing technique. The communications devices 1210-1, 1210-2 may be an embodiment of the sensor nodes 104-1, 104-2, . . . , 104-18, the communications nodes 106-1, 106-2, . . . , 106-10, and/or the ECUs 108-1, 108-2 depicted in FIG. 1, the communications device 510-1, 510-2 depicted in FIG. 2, the communications device 210 depicted in FIG. 2, and/or the sensor nodes 604-1, 604-2, 604-3, 604-4, the communications nodes 606-1, 606-2, 606-3, and/or the ECUs 608-1, 608-2 depicted in FIG. 6. However, the sensor nodes 104-1, 104-2, . . . , 104-18, the communications nodes 106-1, 106-2, . . . , 106-10, and/or the ECUs 108-1, 108-2 depicted in FIG. 1, the communications device 510-1, 510-2 depicted in FIG. 2, the communications device 210 depicted in FIG. 2, and/or the sensor nodes 604-1, 604-2, 604-3, 604-4, the communications nodes 606-1, 606-2, 606-3, and/or the ECUs 608-1, 608-2 depicted in FIG. 6 are not limited to the embodiment shown in FIG. 12. The communications network 1200 may include additional or less components/devices to perform additional or less functions.

In the embodiment depicted in FIG. 12, the communication device 1210-1 includes two PHY units 1226-1, 1226-2 and a data and network layer 1224-1 configured to perform data link layer and/or network layer function. The PHY unit 1226-1 includes an OAM decoder 1282-1 configured to decode an OAM packet, a diagnostic unit 1284-1 configured to perform a diagnosis operation (e.g., packet error detection, erroneous link diagnosis, FEC, and/or CRC), a PHY and link status register 1286-1 configured to store physical and link information (e.g., results from the diagnostic unit 1284-1), an OAM encoder 1288-1 configured to encode or generate an OAM packet, and a multiplexer or selector 1292-1 configured to select one of the inputs from the data and network layer 1224-1 and the OAM encoder 1288-1 to transmit through a communications link 1290-1. The OAM decoder 1282-1, the diagnostic unit 1284-1, and/or the OAM encoder 1288-1 may be implemented in hardware (e.g., circuits), software, firmware, or a combination thereof. In an embodiment, the OAM decoder 1282-1, the diagnostic unit 1284-1, and/or the OAM encoder 1288-1 is implemented using a processor, such as a microcontroller, a host processor, a host, a DSP, or a CPU. The PHY unit 1226-2 includes an OAM decoder 1282-2 configured to decode an OAM packet, a diagnostic unit 1284-2 configured to perform a diagnosis operation (e.g., packet error detection, erroneous link diagnosis, FEC, and/or CRC), a PHY and link status register 1286-2 configured to store physical and link information (e.g., results from the diagnostic unit 1284-2), an OAM encoder 1288-2 configured to encode or generate an OAM packet, and a multiplexer or selector 1292-2 configured to select one of the inputs from the data and network layer 1224-2 and the OAM encoder 1288-2 to transmit through a communications link 1290-2. The OAM decoder 1282-2, the diagnostic unit 1284-2, and/or the OAM encoder 1288-2 may be implemented in hardware (e.g., circuits), software, firmware, or a combination thereof. In an embodiment, the OAM decoder 1282-2, the diagnostic unit 1284-2, and/or the OAM encoder 1288-2 is implemented using a processor, such as a microcontroller, a host processor, a host, a DSP, or a CPU.

In the embodiment depicted in FIG. 12, the communication device 1210-2 includes a PHY unit 1226-3, a data and network layer 1224-1 configured to perform data link layer and/or network layer function, and an adaption layer 1220 that allows data in different protocol formats to tunnel through the communications device by generating packets for all supported protocol formats. The PHY unit 1226-3 includes an OAM decoder 1282-3 configured to decode an OAM packet, a diagnostic unit 1284-3 configured to perform a diagnosis operation (e.g., packet error detection, erroneous link diagnosis, FEC, and/or CRC), a PHY and link status register 1286-3 configured to store physical and link information (e.g., results from the diagnostic unit 1284-3), an OAM encoder 1288-3 configured to encode or generate an OAM packet, and a multiplexer or selector 1292-3 configured to select one of the inputs from the data and network layer 1224-3 and the OAM encoder 1288-3 to transmit through a communications link 1290-2. The OAM decoder 1282-3, the diagnostic unit 1284-3, and/or the OAM encoder 1288-3 may be implemented in hardware (e.g., circuits), software, firmware, or a combination thereof. In an embodiment, the OAM decoder 1282-3, the diagnostic unit 1284-3, and/or the OAM encoder 1288-3 is implemented using a processor, such as a microcontroller, a host processor, a host, a DSP, or a CPU.

In an operation of the communications network 1200, the data and network layer 1224-1 of the communication device 1210-1 generates a packet 1230-1, which includes a header 1232, a payload 1234, and a tail section 1236, and the OAM encoder 1288-2 of the communication device 1210-1 encodes the packet 1230-1 to generate an OAM packet 1230-2, which includes the header 1232, the payload 1234, an OAM section 1238, which may include protocol type, packet counter value, and/or address information (e.g., destination address and/or source address)) of an erroneously transmitted packet, and the tail section 1236. The communication device 1210-2 receives the OAM packet 1230-2 and the OAM decoder 1282-3 of the communication device 1210-2 decodes the OAM packet 1230-2, and the adaption layer 1220 of the communication device 1210-2 re-generates or recovers the packet 1230-1.

Figure 13:
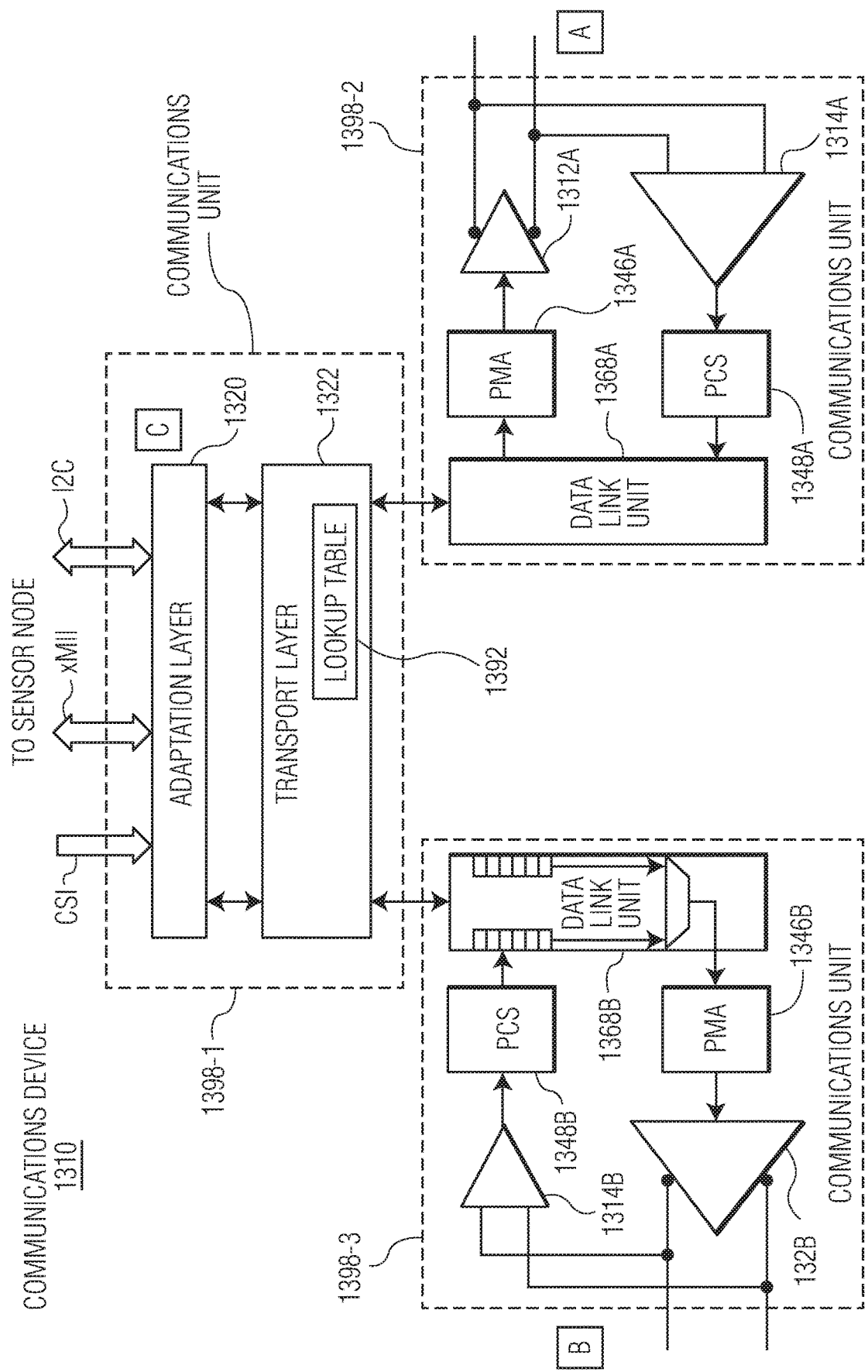
FIG. 13 depicts a communications device in accordance with an embodiment of the invention.

FIG. 13 depicts a communications device 1310 in accordance with an embodiment of the invention. The communications device 1310 may be an embodiment of the sensor nodes 104-1, 104-2, . . . , 104-18, the communications nodes 106-1, 106-2, . . . , 106-10, and/or the ECUs 108-1, 108-2 depicted in FIG. 1, the communications device 510-1, 510-2 depicted in FIG. 2, the communications device 210 depicted in FIG. 2, the sensor nodes 604-1, 604-2, 604-3, 604-4, the communications nodes 606-1, 606-2, 606-3, and/or the ECUs 608-1, 608-2 depicted in FIG. 6, and/or the communications devices 1210-1, 1210-2 depicted in FIG. 12. However, the sensor nodes 104-1, 104-2, . . . , 104-18, the communications nodes 106-1, 106-2, . . . , 106-10, and/or the ECUs 108-1, 108-2 depicted in FIG. 1, the communications device 510-1, 510-2 depicted in FIG. 2, the communications device 210 depicted in FIG. 2, the sensor nodes 604-1, 604-2, 604-3, 604-4, the communications nodes 606-1, 606-2, 606-3, and/or the ECUs 608-1, 608-2 depicted in FIG. 6, and/or the communications devices 1210-1, 1210-2 depicted in FIG. 12 are not limited to the embodiment shown in FIG. 13. In the embodiment depicted in FIG. 15, the communications device 1310 includes three ports, A, B, C, and three communications units 1398-1, 1398-2, 1398-3 for the three ports, A, B, C. However, the number of ports of the communications node is not limited to three. In some embodiments, the communications units are implemented in hardware (e.g., circuits), software, firmware, or a combination thereof. In the embodiment depicted in FIG. 13, the communications unit 1398-1 includes an adaption layer 1320 that is configured to adapt data of different protocols into a universal format and a transport layer 1332 with a port-to-protocol look-up table 1392. The communications unit 1398-2 includes a receiver 1314A, a transmitter 1312A, a physical medium attachment (PMA) 1346A, a physical coding sublayer (PCS) 1348A, and a data link unit 1368A configured to perform data link layer function. The communications unit 1398-3 includes a receiver 1314B, a transmitter 1312B, a PMA 1346B, a PCS 1348B, and a data link unit 1368B configured to perform data link layer function. In some embodiments, the communications unit 1398-2 or 1398-3 is configured to receive a packet at a first port, where a header of the packet includes an address of a destination cluster within a communications network and a communications protocol according to which a destination communications device in the destination cluster communicates, and based on the communications protocol and a port-to-protocol lookup table, transmit the packet or a payload within the packet from the first port to a second port to which the destination communications device is connected. In some embodiments, the communications unit 1398-1 is configured to extract the payload within the packet and create a second packet in accordance with the communications protocol using the payload.

FIG. 14 is a process flow diagram of a method of communications in accordance to an embodiment of the invention. According to the method, at block 1402, at a communications device, an erroneously transmitted packet is detected based on a communications protocol associated with the erroneously transmitted packet. At block 1404, from the communication device, a wired communications network of the erroneously transmitted packet is notified of the erroneously transmitted packet. The communications device may be similar to, the same as, or a component of the sensor nodes 104-1, 104-2, . . . , 104-18, the communications nodes 106-1, 106-2, . . . , 106-10, and the ECUs 108-1, 108-2 depicted in FIG. 1, the communications device 210 depicted in FIG. 2, the communications device 510-1, 510-2 depicted in FIG. 5, the sensor nodes 604-1, 604-2, 604-3, 604-4, communications nodes 606-1, 606-2, 606-3, and ECUs 608-1, 608-2 depicted in FIG. 6, the communications device 1210-1, 1210-2 depicted in FIG. 12, and/or the communications device 1310 depicted in FIG. 13. The wired communications network may be similar to, the same as, or a component of the communications network 100 depicted in FIG. 1, the communications network 500 depicted in FIG. 5, and/or the communications network 1200 depicted in FIG. 12.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of detecting a communications error in an in-vehicle network (IVN), the method comprising:
receiving, by a transceiver unit of an electronic control unit of the IVN, a packet encoded in accordance with a first communications protocol type and associated with a first packet counter value, wherein the electronic control unit is configured to receive packets encoded according to a set of communication protocol types;
determining, by the electronic control unit, an allowable range of packet counter values based upon the first communications protocol type;
determining, by the electronic control unit, that the packet is an erroneously transmitted packet based on at least one of a first determination that the first communications protocol type is not in the set of communication protocol types and a second determination that the first packet counter value associated with the packet is not in the allowable range of packet counter values; and
responsive to determining that the packet is the erroneously transmitted packet, from the electronic control unit, notifying a daisy chain node of the IVN that is directly coupled to the transceiver unit of the erroneously transmitted packet.

2. The method of claim 1, wherein notifying the daisy chain node of the erroneously transmitted packet comprises transmitting an operations, administration, and management (OAM) packet that comprises information related to the first communications protocol type and the first packet counter value associated with the erroneously transmitted packet.

3. The method of claim 2, wherein the information related to the first communications protocol type associated with the erroneously transmitted packet further comprises an address associated with the erroneously transmitted packet.

4. The method of claim 2, further comprising:
accessing, by the daisy chain node, an incoming stream register of the daisy chain node, wherein the incoming stream register includes communication protocol types and packet counter values for a plurality of packets received by the daisy chain node; and
determining, by the daisy chain node, whether the information related to the first communications protocol type and the first packet counter value associated with the erroneously transmitted packet matches the communication protocol type and the packet counter value for a first packet of the plurality of packets received by the daisy chain node.

5. The method of claim 4, further comprising determining a communications link between the electronic control unit and the daisy chain node as being error free when the information related to the first communications protocol type and the first packet counter value associated with the erroneously transmitted packet matches the communication protocol type and the packet counter value for the first packet of the plurality of packets.

6. The method of claim 4, further comprising determining a communications link between the electronic control unit and the daisy chain node as being erroneous when the information related to the first communications protocol type and the first packet counter value associated with the erroneously transmitted packet does not match the communication protocol type and the packet counter value for any packet of the plurality of packets.

7. The method of claim 1, wherein detecting the erroneously transmitted packet based on the first communications protocol type associated with the erroneously transmitted packet comprises detecting the erroneously transmitted packet based on the first communications protocol type in which the erroneously transmitted packet is formatted.

8. The method of claim 7, wherein detecting the erroneously transmitted packet based on the first communications protocol type associated with the erroneously transmitted packet comprises detecting the erroneously transmitted packet based on the first communications protocol type in which the erroneously transmitted packet is formatted and the first packet counter value associated with the erroneously transmitted packet.

9. The method of claim 8, wherein detecting the erroneously transmitted packet based on the first communications protocol type associated with the erroneously transmitted packet comprises detecting the erroneously transmitted packet based on the first communications protocol type in which the erroneously transmitted packet is formatted, the first packet counter value associated with the erroneously transmitted packet and an address associated with the erroneously transmitted packet.

10. The method of claim 1, wherein the IVN is an asymmetrical communications network such that communications in a first direction of a network connection within the IVN occur at a first rate that is higher than a second rate at which communications in a second direction of the network connection occurs, and wherein the first direction is opposite to the second direction.

11. A communications device comprising:
a packet error detection unit configured to:
receive a packet encoded in accordance with a first communications protocol type and associated with a first packet counter value, wherein the packet error detection unit is configured to receive packets encoded according to a set of communication protocol types;
determine an allowable range of packet counter values based upon the first communications protocol type;
determine that the packet is an erroneously transmitted packet based on at least one of a first determination that that the first communications protocol type is not in the set of communication protocol types and a second determination that the first packet counter value associated with the packet is not in the allowable range of packet counter values; and
a transmitter unit configured to notify a wired communications network of the erroneously transmitted packet.

12. The communications device of claim 11, wherein the transmitter unit is configured to transmit an operations, administration, and management (OAM) packet that comprises information related to the communications protocol associated with the erroneously transmitted packet.

13. The communications device of claim 12, wherein the information related to the communications protocol associated with the erroneously transmitted packet further comprises an address associated with the erroneously transmitted packet.

14. The communications device of claim 11, wherein the packet error detection unit is further configured to detect the erroneously transmitted packet based on the communications protocol in which the erroneously transmitted packet is formatted.

15. The communications device of claim 14, wherein the packet error detection unit is further configured to detect the erroneously transmitted packet based on the communications protocol in which the erroneously transmitted packet is formatted and the packet counter value associated with the erroneously transmitted packet.

16. The communications device of claim 11, wherein the wired communications network is an in-vehicle network (IVN).

17. A wired communications network comprising:
a wired transmission media; and
a plurality of communications devices configured to communicate via the wired transmission media, wherein each of the communications devices is configured to:
receive a packet encoded in accordance with a first communications protocol type and associated with a first packet counter value, wherein the communication device is configured to receive packets encoded according to a set of communication protocol types;
determine an allowable range of packet counter values based upon the first communications protocol type;
determine that the packet is an erroneously transmitted packet based on at least one of a first determination that that the first communications protocol type is not in the set of communication protocol types and a second determination that the first packet counter value associated with the packet is not in the allowable range of packet counter values; and
notify the wired communications network of the erroneously transmitted packet.

* * * * *